United States Patent

[11] 3,571,609

[72] Inventor Louis I Knudson
Norwich, N.Y.
[21] Appl. No. 851,699
[22] Filed Aug. 20, 1969
[45] Patented Mar. 23, 1971
[73] Assignee General Laboratory Associates Incorporated
Norwich, N.Y.

[54] IGNITION APPARATUS SELECTIVELY OPERABLE AT DIFFERENT LEVELS OF DISCHARGE ENERGY
15 Claims, 9 Drawing Figs.

[52] U.S. Cl. .......... 307/106, 102/70.2, 315/183, 317/80
[51] Int. Cl. .......... H03k 3/00
[50] Field of Search .......... 317/80, 79, 96, 107—8; 307/106, 305, 252, 324; 102/70.2, 22; 431/66; 315/183

[56] References Cited

UNITED STATES PATENTS

| | | | |
|---|---|---|---|
| 3,255,366 | 6/1966 | McNulty et al. .......... | 307/106 |
| 3,312,869 | 4/1967 | Werner .......... | 317/80 |
| 3,383,553 | 5/1968 | Parish et al. .......... | 315/183 |
| 3,424,924 | 1/1969 | Leisinger et al. .......... | 307/252 |
| 3,428,823 | 2/1969 | Pinckaers .......... | 307/106 |
| 3,515,355 | 5/1970 | Shanks .......... | 317/80 |

*Primary Examiner*—Volodymyr Y. Mayewski
*Attorneys*—Lester W. Clark, Robert S. Dunham, P. E. Henninger, Thomas F. Moran, Gerald W. Griffin, R. Bradee Boal and Christopher C. Dunham

ABSTRACT: Ignition apparatus selectively operable to produce sparks at any of a plurality of energy levels. The apparatus includes a chargeable and dischargeable network having one common terminal, a plurality of other terminals, and a plurality of capacitors. The capacitors may have different capacitances and are connected to the terminals so as to provide substantially different effective capacitances between different pairs of terminals. A plurality of selectively actuatable energy supply sources are provided, each connected between different pairs of terminals of the networks. The means for discharging the network includes a potential responsive breakdown impedance means and an igniter.

Preferably, an inductive element is connected in series with the igniter and a diode is connected in parallel with the series branch circuit including the inductive element and the igniter. The diode is effective to maintain the discharge from the capacitive network through the igniter as a unidirectional flow, instead of allowing it to oscillate. Since the discharging currents in the capacitors flow only in one direction, the switching of the various capacitors may then be performed by diodes rather than by more complex switching devices. Combinations of capacitors in the network may be selected by selection of one or more of the energy sources, so as to supply the igniter with energy at any plurality of different levels.

In certain modifications all the capacitors in the network are utilized for every energy discharge, the energy level being determined by the selection of the pair of terminals at which the network is charged. Such a network may deliver energy to one or more igniters.

INVENTOR.
LOUIS I. KNUDSON
BY Lester Clark
ATTORNEY

INVENTOR.
LOUIS I. KNUDSON
BY Lester W. Clark
ATTORNEY

INVENTOR
LOUIS I. KNUDSON
BY Lester W Clark
ATTORNEY

IGNITION APPARATUS SELECTIVELY OPERABLE AT DIFFERENT LEVELS OF DISCHARGE ENERGY

BRIEF SUMMARY OF THE INVENTION

This invention relates to ignition systems of the high voltage, capacitance discharge type, of which the system shown in the U.S. Pat. to McNulty et al., No. 3,255,366, issued Jun. 7, 1966, is typical. It is sometimes desired to operate such systems at different energy levels. For example, in an aircraft jet engine, it may be desirable to operate the ignition system at a relatively low energy level at normal cruising conditions and to operate it at a somewhat higher energy level in more hazardous conditions, such as takeoff and landing, when it is highly essential to avoid any possibility of a flameout of the engine. Since such systems involve the discharge of capacitors which have been charged to very high potentials, it has been difficult to provide a control system, which is simple and reliable and which will effectively transfer an energy storage capacitance network from one energy level to another. Such a transfer of a capacitance network is accomplished in accordance with the present invention.

In some modifications of the invention, a diode is connected in parallel with a branch circuit containing the igniter and an inductive element in series. This diode is effective to maintain the discharge through the igniter as a unidirectional discharge, rather than an oscillating discharge. This unidirectional quality is thereby retained in the capacitors of the energy storage network, so that effective switching of capacitors in and out of the network may be accomplished by appropriately biased blocking diodes rather than by more complex structures.

In other modifications of the invention, a plurality of network discharge paths are provided, each with its own potential responsive breakdown impedance means. Each discharge path is connected between a different pair of network terminals and a selection of discharge paths is made by selecting the output terminals through which the network is charged.

BRIEF DESCRIPTION OF THE DRAWINGS

FIG. 1

Figures 1, 2, 3, 4:
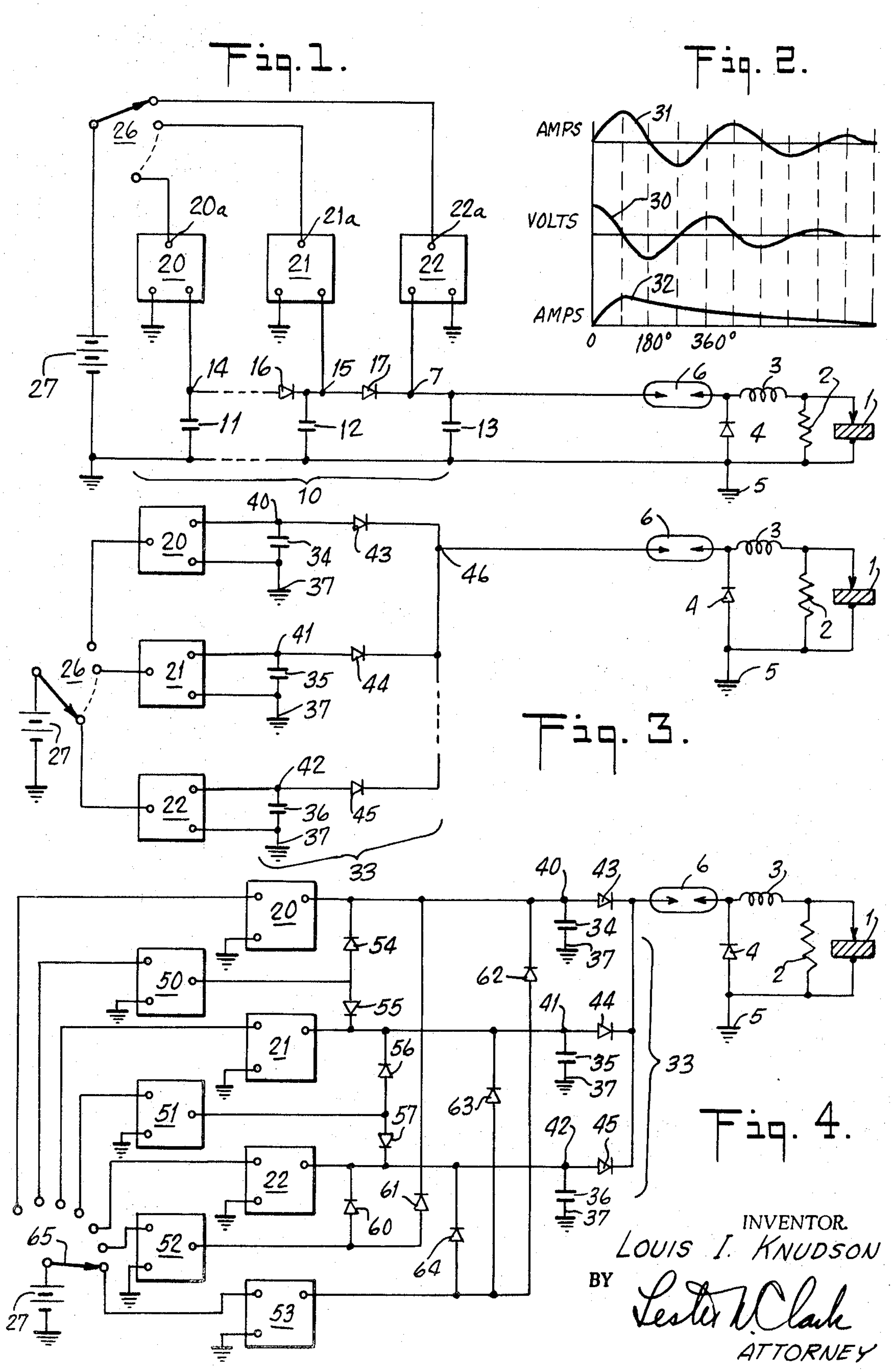
FIG. 1 is a wiring diagram of an ignition system embodying certain features of the invention.
FIG. 2 is a graphical illustration of the variations with time of the current in the igniter of FIG. 1, as compared with the current and potential variation in a conventional system.
FIG. 3 is a wiring diagram of another embodiment of the invention.
FIG. 4 is a wiring diagram of still another embodiment of the invention.

This FIG. illustrates an ignition system including an igniter 1 which is illustrated as being of the surface conductive semiconductor type. Alternatively, it could be a simple spark gap. The igniter 1 is shown as being shunted by a resistor 2 which may represent the resistance of the semiconductor material. An inductive impedance element 3 is connected in series with the parallel group consisting of igniter 1 and resistor 2. A diode 4 is connected in parallel with the network including igniter 1, resistor 2 and inductive impedance element 3.

Igniter 1, resistor 2 and diode 4 are each connected to a common network terminal 5, shown as being a grounded terminal. The network including igniter 1, resistor 2, inductor 3, and diode 4 constitutes a load for the ignition system.

A potential responsive breakdown means 6 has one terminal connected to the junction of inductor 3 and diode 4 and another terminal connected to a terminal 7 of a chargeable and dischargeable network 10.

The impedance means 6 is typically a sealed air gap which has a normally high impedance condition until it is broken down by the application of a predetermined high potential between its electrodes. After such a breakdown, it changes suddenly to a low impedance condition which continues until the potential between its electrodes is substantially lowered.

The diode 4 must have a high reverse breakdown potential, and high current carrying capacity (100—1,000 amps.) in the forward direction. It must also break down rapidly in the forward direction, upon the application of a potential to its electrodes. Silicon diodes are currently available which meet these requirements. Although diode 4 is shown as a single diode, several diodes in series may be used to secure the required high reverse breakdown potential.

The network 10 comprises a plurality of capacitors 11, 12 and 13, each having one electrode connected to the common network terminal 5. The other electrode of capacitor 11 is connected to a network terminal 14 and the other electrode of capacitor 12 is connected to a network terminal 15. The other electrode of capacitor 13 is connected to terminal 7.

A diode 16 connects terminals 14 and 15 and a diode 17 connects terminals 15 and 7. The diodes 16 and 17 are poled in a direction to permit discharge of the capacitors 11 and 12 only in a direction toward the breakdown impedance means 6. Three energy supply means are shown at 20, 21, and 22. Each of these energy supply means may comprise one of the systems shown in the McNulty et al. U.S. Pat. No. 3,255,366, identified above. Each of the energy supply means 20, 21 and 22 has an output terminal connected to one of the network terminals 14, 15 and 7.

Each of the energy supply means 20, 21 and 22 has a grounded terminal and also has an input terminal 20*a*, 21*a*, 22*a*, each connected to a stationary contact of a selector switch 26, having a movable contact connected to one terminal of a battery 27, whose opposite terminal is grounded. Any suitable equivalent selector means may be used in place of switch 26.

Numerous alternatives are available for the energy supply means 20, 21 and 22. For example, if the battery 27 has a sufficiently high output potential, then each of the energy supply means 20, 21 and 22 may simply be a resistor to determine the charging rate of the associated capacitor. In a similar manner, each of the energy supply means 20, 21 and 22 may be an inductor to determine the charging rate, with a diode connected between the inductor and the respective terminal 7, 14 or 15 to prevent a backward flow of current through the inductor. Such a blocking diode may be used whenever the characteristics of the energy supply means require it.

Instead of locating the switch 26 as shown, the battery 27 may be connected directly to a DC power converter, for example of the type shown in the McNulty et al. U.S. Pat. No. 3,255,366, whose output may then be switched between the terminals 14, 15 and 7.

The battery 27 might be replaced by an alternating current supply, with the energy supply means 20, 21 and 22 including suitable AC to DC converters. Similarly, battery 27 might be replaced by an alternating current supply, and the latter might energize a single AC to DC converter whose output could be selectively switched to the terminals 7, 14 and 15.

The circuit of FIG. 1 is iterative, i.e., the number of units consisting of an energy supply means such as 20, a capacitor, such as 11, and a blocking diode, such as 16, could be increased indefinitely.

OPERATION OF FIG. 1

With the switch 26 closed on its upper stationary contact, as shown, the energy supply means 22 is activated and charges the capacitor 13 with its upper electrode positive. (It is assumed that all of the capacitors in the network are charged with their upper electrodes positive).

When the potential on capacitor 13 reaches a predetermined value established by the characteristics of the breakdown gap 6 and the igniter 1, the gap 6 breaks down and the charge on capacitor 13 flows through the gap 6, inductor 3 and igniter 1. Referring to FIG. 2, the curve 30 shows the variation in potential across the gap 6 during discharge of the capacitor 13 in the absence of the diode 4. The curve 31 indicates the variation in current through diode 6, igniter 1 and capacitor 13 in the absence of the diode 4. The curve 32 shows the variation in current through the igniter 1 when the diode 4 is connected as shown. It may be seen that the curves 30 and 31 illustrate an oscillating discharge of decreasing amplitude. Curve 32 shows that when the diode is used, the current reaches its peak at the instant of zero potential in curve 30. At this time, all the energy of the oscillating circuit is stored in the inductor 3. The capacitor elements in that circuit are now shunted by the diode 4, so that the current from the collapsing magnetic field of inductor 3 flows continuously in one direction, decreasing gradually over a time corresponding to several cycles of oscillation.

Because of the presence of the diode 4, potential across the capacitor 13 is never reversed during discharging of the capacitor. It is therefore entirely feasible to isolate capacitor 13 from the other capacitors 11 and 12 in the network by means of the diode 17. Hence, when switch 26 is closed on its upper stationary contact, capacitor 13 is effectively the only active capacitance in the network and the energy discharged through igniter 1 when the gap 6 breaks down is equal to the energy stored on capacitor 13.

When switch 26 is closed on its intermediate stationary contact, the network 10 is charged through the energy supply means 21. The diode 17 passes the charging pulses from the supply means 21 so that it is effective to charge both capacitors 12 and 13. Furthermore, when the gap 6 breaks down, the energy discharge is supplied from both the capacitors 12 and 13 and hence is substantially greater than the energy stored in capacitor 13 alone.

When the switch 26 is closed on its lower stationary contact, the network 10 is charged by the source 20 and all three of the capacitors 11, 12 and 13 are charged.

The potential at which gap 6 breaks down is always the same, but the quantity of energy supplied to the igniter 1 may be increased substantially by including more capacitance in the network, by the selection of the proper energy supply source.

If the energy supply sources 20, 21 and 22 have the same output characteristics, it is obvious that a greater time will be required to charge the network with higher energy than is required when the network can be charged with lower energy.

FIG. 3

The circuit of FIG. 3 has somewhat different chargeable network 33 replacing the chargeable network 10 of FIG. 1. The network 33 has three capacitors 34, 35 and 36, each having one electrode connected to a common terminal 37. The other electrodes of the three capacitors are respectively connected to other terminals 40, 41 and 42 of the network. Terminals 40, 41, and 42 are connected through the diodes 43, 44 and 45, respectively to a second common terminal 46 of the network.

The energy supply means 20, 21 and 22 may be the same as the energy supply means bearing the same numbers in FIG. 1, and their selection may be controlled by the same switch 26 connected to battery 27. The same alternatives are available, and the circuit is iterative, as described above in connection with FIG. 1.

OPERATION OF FIG. 3

In the network of FIG. 3, only one of the three capacitors 34, 35, 36 is actively connected to network terminal 46 at any one time. Hence, in order to charge the network 33 to different energy levels, it is essential that capacitors having different values of capacitance be used. By suitably modifying the selector switch 26, the network of FIG. 3 may be changed so that a plurality of the capacitors 34, 35, 36 may be used at one time, in any combination.

FIG. 4

The system of FIG. 4 is based on the system of FIG. 3 but adds thereto four additional energy supply means 50, 51, 52 and 53. Each of the energy supply means 50, 51 and 52 has its output terminal connected through a pair of diodes to two terminals of the network 33, other than the common terminal 37. The energy supply means 50 is connected through diodes 54 and 55 to terminals 40 and 41 respectively. Energy supply means 51 is connected to diodes 56 and 57 to terminals 41 and 42 respectively. Energy supply means 52 is connected through diodes 60 and 61 to terminals 42 and 40, respectively. Energy supply means 53 is connected through three diodes 62, 63, 64 to terminals 40, 41, 42, respectively. The selection of the several energy supply means 20, 21 and 22, 51, 52 and 53 is controlled by a selector switch 65 connected through battery 27 to ground.

By appropriately positioning the switch 65, variation of the capacitors 34, 35 and 36 may be selected for inclusion in the active capacitor network, thereby permitting charging of the network to any one of seven different energy levels, all of which are characterized by the same breakdown voltage at the gap 6.

The system of FIG. 4 is also iterative.

FIG. 5

Figure 5:
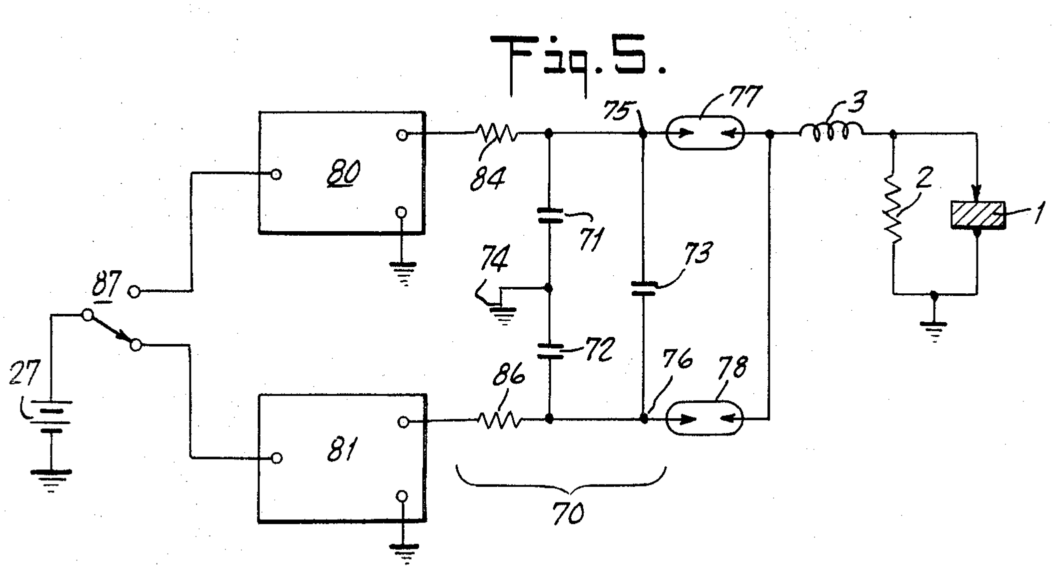
FIG. 5 is a wiring diagram of a modified system embodying certain other features of the invention.

The ignition system in this FIG. omits the diode 4 in the igniter circuit and does not use switching diodes in the energy storage network. The chargeable storage network of FIG. 5 is shown generally at 70 and includes three capacitors 71, 72 and 73. The capacitors 71 and 72 each have an electrode connected to ground at 74. The other electrode of capacitor 71 and one electrode of capacitor 73 are connected to a terminal 75. The other electrode of capacitor 72 and the other electrode of the capacitor 73 are connected to another terminal 76.

A sealed gap or other potential-responsive breakdown impedance means 77 connects the terminal 75 to the load network including inductor 3, igniter 1 and resistor 2. A second breakdown gap 78 connects the terminal 76 the load network. The breakdown potentials of the gaps 77 and 78 are separately determinable.

Two energy supply means are provided at 80 and 81. The energy supply means 80 has an output terminal connected through resistor 84 to terminal 75 of the energy storage network. Energy supply means 81 has an output terminal connected through resistor 86 to terminal 76 of the energy storage network. The energy supply means 80 and 81 have respective input terminals connected to stationary contacts of a selector switch 87 whose moveable contact is connected to battery 27.

The capacitance values of the capacitors 71, 72 and 73 are selected to be different, so that when the network is charged across the terminals 75 and 74 by the energy supply means 80, it stores a different quantity of energy for a particular breakdown potential at gap 77 than is the case when the network is charged between terminals 76 and 74 by the energy supply means 81. When the energy supply means 80 is selected, the capacitor 71 is directly between the charging terminals and the capacitors 72 and 73 are in series between the charging terminals. On the other hand, when the energy supply means 81 is selected, the capacitor 72 is directly between the charging terminals and the capacitors 71 and 73 are in series between the charging terminals. Hence, the gap 78 may be selected to have a different breakdown potential than the gap 77 and will deliver a different quantity of energy to igniter 1 than will be delivered through the gap 77. Hence the energy level of igniter 1 may be selected by operation of the selector switch 87.

FIG. 6

This FIG. illustrates a system similar to that of FIG. 5, except that a second igniter 90 is used, connected in parallel with a resistance 91, the parallel group being connected in series with an inductor 92 and a potential-responsive breakdown impedance means 93. In this system, the operation is similar to that of FIG. 5, except that when the gap 93 breaks down, the energy stored in the network 70 is delivered to the igniter 90 rather than the igniter 1. Note that in both FIGS. 5 and 6, the capacitors 71, 72 and 73 are all active in both of the selected conditions of operation.

FIG. 7

Figure 6:
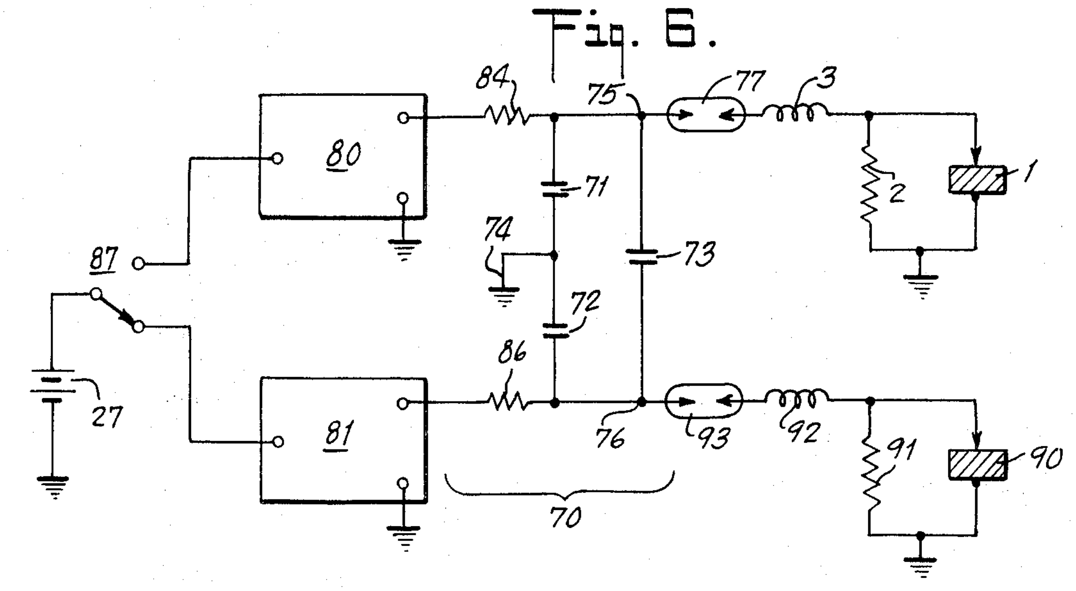
FIG. 6 is a wiring diagram showing a modification of the system of FIG. 5.

This FIG. is a fragmentary diagram intended for substitution in either FIGS. 5 and 6 to show that the diode 4 of FIG. 1 may be used in the systems of either of those FIGS., if it is desired to prevent oscillatory discharges through the igniters.

While the selector switches 26, 65 and 87 have been shown as mechanical devices for the sake of simplicity, it will be readily understood that other equivalent mechanisms may be substituted.

FIG. 8

Figure 8:
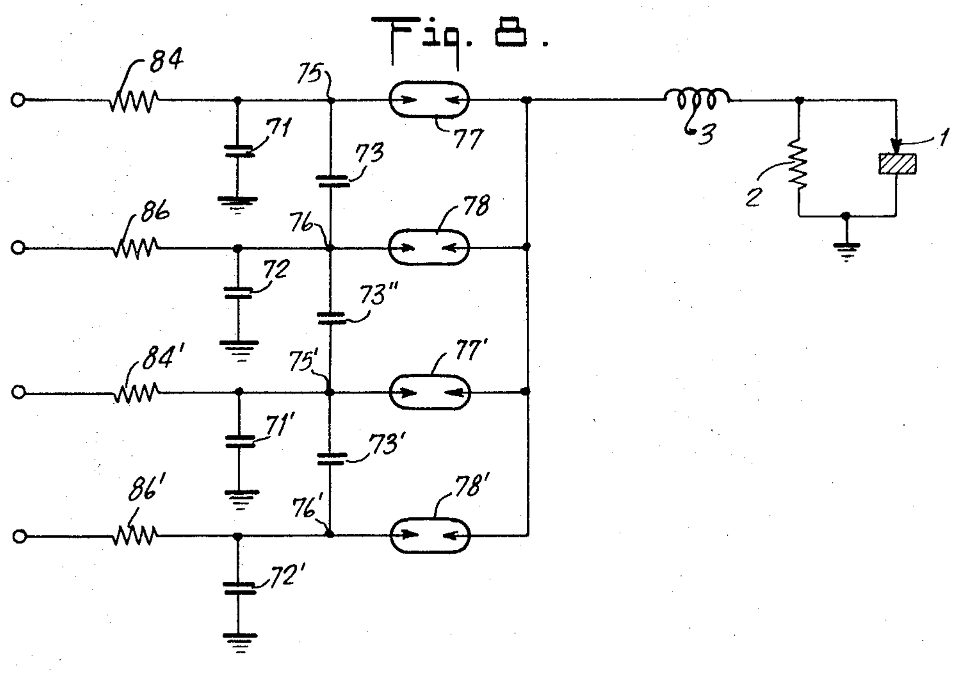
FIG. 8 is a wiring diagram of an iterative form of the system of FIG. 5.

FIG. 8 illustrates an iterative form of the system of FIG. 5. In other words, the network of FIG. 5 is expanded so that it includes seven capacitors, 71, 72, 73, 71′, 72′, 73′ and 73″, in place of the three capacitors of FIG. 5. Similarly, the system includes four potential-responsive breakdown impedance means, 77, 78, 77′ and 78′, all connected to deliver their discharge energy to the single load igniter 1.

It will be readily understood that the elements of the system of FIG. 5 may be indefinitely multiplied, following along the lines suggested in FIG. 8. The shunting diode 4 may be used in this system, in the manner illustrated in FIG. 7.

FIG. 9

This FIG. illustrates a system which is a sort of compound iteration of the system of FIG. 5 and the system of FIG. 6. It is shown as supplying four igniters numbered respectively 1, 90, 100 and 101. The igniters 1 and 90 correspond to the igniters bearing the same numerals in FIG. 6, and are similarly supplied with energy. The igniter 100 corresponds more nearly to the igniter 1 of FIG. 5, being supplied with energy through two voltage-responsive breakdown impedance means 102 and 103. The igniter 101 is an iteration of the igniters 1 and 90 of FIG. 6.

Igniter 1 can be energized by supplying pulses of energy to input terminal 104 only. Igniter 90 can be energized by supplying input pulses to terminal 105 only. Igniter 100 may be energized selectively at either of two levels by supplying energy to either of the input terminals 104 and 107. Igniter 101 can be energized only by supplying energy to the input terminal 108.

It will be readily recognized that when any of the five input terminals 104 to 108 is energized, all the capacitors in the network are effective to store energy. The particular level of energy stored in the network at the breakdown of a particular one of the impedance means 77, 93, 102, 103, 109 is determined by the particular one of the input terminals 104 through 108 which is selected.

Figure 7:
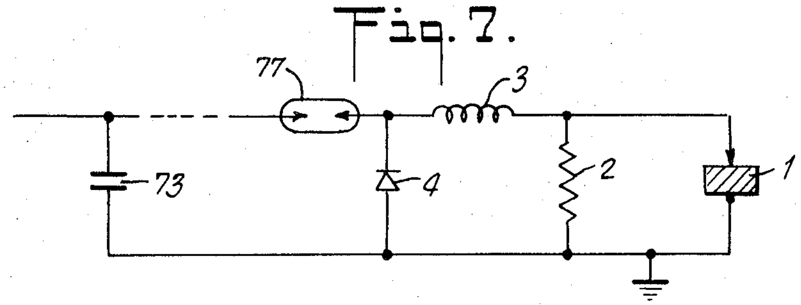
FIG. 7 is a wiring diagram showing a modification which can be applied to either FIG. 5 or FIG. 6.
Figure 9:
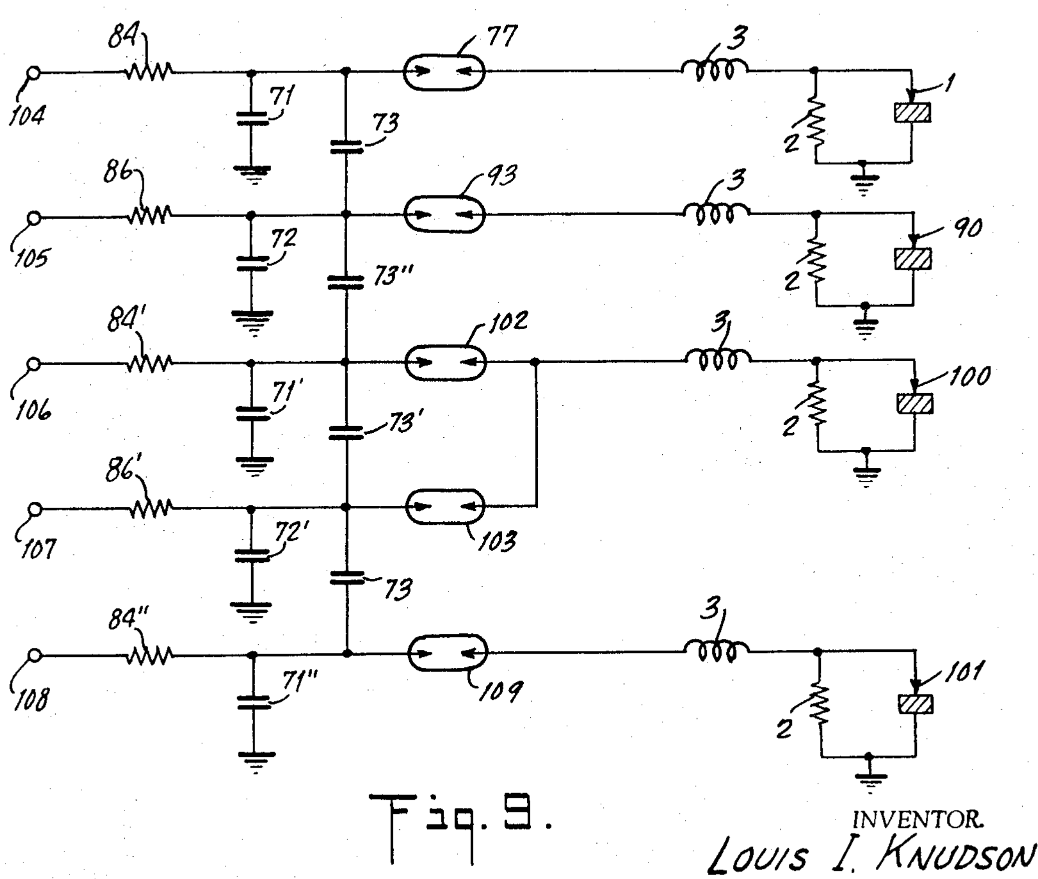
FIG. 9 is a wiring diagram of an iterative form of the system of FIG. 6.

A shunting diode, such as diode 4 of FIG. 7, may be used with any of the igniters of FIG. 9. Similar diodes may be used with any combination of the igniters of FIG. 9, and omitted from any of the other igniters of that FIG.

The capacitors and resistors in FIGS. 8 and 9 have been given primed and double primed reference numerals similar to their most nearly corresponding counterpart in FIGS. 5 and 6.

The circuits of FIGS. 5 and 6 may be arranged in many other permutations and combinations than the one shown in FIG. 9.

I claim:

1. Apparatus for controlling the distribution of electrical energy from plural energy supply means comprising:
a. a chargeable and dischargeable electrical network, including:
1. at least three network terminals;
2. a plurality of capacitors, each having two electrodes;
3. means connecting each terminal to at least one electrode;
4. said capacitors having different capacitances and being connected to the terminals to provide substantially different effective capacitances between different pairs of terminals;
b. first and second selectively actuatable energy supply means for charging the network;
c. an electrical load;
d. potential-responsive breakdown impedance means having two terminals and shiftable from a high impedance condition to a low impedance condition when the potential between said terminals exceeds a predetermined value;
e. network-discharging means including said potential-responsive means and said load;
wherein the improvement comprises:
f. means connecting the first energy supply means between one pair of network terminals for charging the network with a first quantity of energy;
g. means connecting the second energy supply means between another pair of network terminals for charging the network with a second substantially different quantity of energy; and
h. means connecting at least part of said network discharging means between first and second network terminals and effective to discharge the network when the potential between said terminals exceeds a value determined by the characteristics of said part of the network-discharging means.

2. Apparatus as defined in claim 1, in which:
a. said network-discharging means comprises first diode means connecting one network terminal and one terminal of the potential-responsive means, said diode means being effective to maintain the discharging current through said igniter in a predetermined direction; and
b. second diode means connected between pairs of terminals of the network and poled to pass current toward said discharging means only in a direction to pass through said igniter in said predetermined direction.

3. Apparatus as defined in claim 2, in which:
a. one electrode of each capacitor is connected to a common terminal of the network;
b. the other electrode of each capacitor is connected to an individual energy supply means and to one of the other terminals of the network; and
c. diode means are connected between each pair of said other terminals and poled to pass current toward said network-discharging means only in a direction to pass through said load means in a predetermined direction.

4. Apparatus as defined in claim 2, in which said network comprises:
a. a common terminal connected to one electrode of each of said capacitors;
b. a plurality of other terminals, each connected to an individual source of energy; and
c. a plurality of diodes, each connecting one of said other terminals to a second common terminal of said network.

5. Apparatus as defined in claim 4, including:
a. a further plurality of energy supply means; and
b. a plurality of diodes for each of said further plurality of energy supply means, each said plurality of diodes connecting its associated energy supply means to a preselected combination of said other network terminals.

6. Apparatus as defined in claim 1, in which:
a. said network comprises three capacitors;
b. means connecting a common terminal of the network to one electrode of only two of the three capacitors; and c. means connecting each other terminal of the network to the other electrode of one of said two capacitors and to an electrode of the third capacitor.

7. Apparatus as defined in claim 6, including two potential-responsive breakdown impedance means, each having:

1. one terminal connected to one of said other terminals of the network; and
2. another terminal connected to said load.

8. Apparatus as defined in claim 6, including:

a. two electrical loads; and
b. two potential-responsive breakdown impedance means, each connected between one of said other terminals of the network and one of said loads.

9. Ignition apparatus, including:

a. an igniter;
b. inductive impedance means;
c. potential-responsive means having two terminals and shiftable from a high impedance condition to a low impedance condition when the potential between said terminals exceeds a predetermined value;
d. a chargeable and dischargeable electrical network, comprising:
   1. at least three network terminals;
   2. a plurality of capacitors, each having two electrodes;
   3. means connecting each of said network terminals to at least one of said electrodes;
e. means for discharging the network, including:
   1. means connecting the inductive impedance means and the igniter in series between a first network terminal and one terminal of the potential-responsive means;
   2. means connecting a second network terminal to the other terminal of the potential-responsive means;
f. first electrical energy supply means connected between one pair of network terminals for charging the network with a first quantity of energy while increasing the potential between said first and second network terminals to said predetermined value;
g. second electrical energy supply means connected between another pair of network terminals for charging the network with a second quantity of energy while increasing the potential between said first and second network terminals to said predetermined value; and
h. means for selectively actuating said first and second electrical energy supply means; wherein the improvement comprises:
i. first diode means connecting said first network terminal and said one terminal of the potential-responsive means, said first diode means being effective to maintain the discharge current through said igniter in a predetermined direction; and
j. second diode means connected between at least one of said first and second network terminals and the third terminal of the network, and poled to pass current from said third terminal toward said discharging means only in a direction to pass through said igniter in said predetermined direction.

10. Apparatus as defined in claim 8, in which each said network comprises:

a. a common terminal connected to one electrode of each capacitor;
b. a plurality of other terminals, each connected to the other electrode of one of said capacitors; and
c. a corresponding plurality of energy supply means, each connected to one of said other terminals.

11. Apparatus as defined in claim 9, in which said network includes:

a. a common terminal connected to one electrode of each capacitor;
b. a plurality of other terminals, each connected to one other electrode of a capacitor; and
c. a corresponding plurality of diodes connected between one of said other terminals and a second common terminal of the network.

12. Apparatus as defined in claim 8, including:

a. a further plurality of energy supply means, corresponding in number to predetermined combinations of said other electrodes:
b. a plurality of diodes for each of said further plurality of energy supply means, and connecting its associated energy supply means to a predetermined combination of said other terminals.

13. Ignition apparatus for delivering a spark selectively at either of two energies, comprising:

a. igniter means;
b. a chargeable and dischargeable electrical network including:
   1. three capacitors, each having two electrodes;
   2. means connecting a common terminal of the network to one electrode of each of two of the three capacitors;
   3. means connecting the other terminals of the network to other electrodes of said two capacitors and to one electrode of the third capacitor;
c. first and second selectively actuatable energy supply means for charging the network and connected respectively to other terminals of the network.
d. first and second potential-responsive breakdown impedance means, each having two terminals and shiftable from a high impedance condition to a low impedance condition when the potential between its terminals exceeds a predetermined value, the said predetermined value being separately determined for each of said impedance means;
e. means connecting one terminal of each of said impedance means to one of said other terminals of the network;
f. means connecting the other terminals of both said impedance means to said igniter means.

14. Apparatus as defined in claim 13, in which said igniter means comprises a single igniter connected to both said breakdown impedance means and operable at either of two energies, depending upon the selection of the energy supply means.

15. Apparatus as defined in claim 13, in which said igniter means comprises two igniters, each connected to the other terminal of one of said two breakdown impedance means, either of said igniters being selectable for operation by selection of one of said energy supply means.

Disclaimer 3,571,609.—*Louis I. Knudson*, Norwich, N.Y. IGNITION APPARATUS SELECTIVELY OPERABLE AT DIFFERENT LEVELS OF DISCHARGE ENERGY. Patent dated Mar. 23, 1971. Disclaimer filed Nov. 6, 1974, by the assignee, *General Laboratory Associated, Inc.*

Hereby enters this disclaimer to claims 9 and 10 of said patent.

[*Official Gazette June 24, 1975.*]